(12) United States Patent
Kurumizawa et al.

(10) Patent No.: US 9,281,618 B2
(45) Date of Patent: Mar. 8, 2016

(54) LOCK DEVICE

(71) Applicant: KABUSHIKI KAISHA TOKAI RIKA DENKI SEISAKUSHO, Aichi (JP)

(72) Inventors: Naoto Kurumizawa, Aichi (JP); Keiji Kahara, Aichi (JP); Toshiharu Katagiri, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 14/086,108

(22) Filed: Nov. 21, 2013

(65) Prior Publication Data

US 2014/0169865 A1 Jun. 19, 2014

(30) Foreign Application Priority Data

Dec. 13, 2012 (JP) ................................. 2012-272492

(51) Int. Cl.
| | |
|---|---|
| *H01R 13/639* | (2006.01) |
| *B60L 11/18* | (2006.01) |
| *B60L 1/00* | (2006.01) |
| *B60L 3/00* | (2006.01) |
| *B60L 3/04* | (2006.01) |
| *H01R 13/627* | (2006.01) |

(52) U.S. Cl.
CPC .............. *H01R 13/639* (2013.01); *B60L 1/003* (2013.01); *B60L 3/0046* (2013.01); *B60L 3/0084* (2013.01); *B60L 3/04* (2013.01); *B60L 11/1818* (2013.01); *B60L 2270/32* (2013.01); *B60L 2270/34* (2013.01); *H01R 13/6275* (2013.01); *Y10T 403/591* (2015.01)

(58) Field of Classification Search
USPC ............ 439/304, 352; 403/332.1, 322.3, 315, 403/324; 70/277, 278.7, 280–282; 292/170
See application file for complete search history.

(56) References Cited

U.S. PATENT DOCUMENTS

| | | | | | |
|---|---|---|---|---|---|
| 3,117,803 | A | * | 1/1964 | Saewert | 280/433 |
| 5,385,480 | A | * | 1/1995 | Hoffman | 439/310 |
| 5,413,493 | A | * | 5/1995 | Hoffman | 439/188 |
| 5,478,250 | A | * | 12/1995 | Hoffman | 439/142 |
| 5,852,943 | A | * | 12/1998 | Dutka et al. | 70/237 |

(Continued)

FOREIGN PATENT DOCUMENTS

| | | |
|---|---|---|
| JP | 2009-081917 | 4/2009 |
| JP | 2011-231555 | 11/2011 |

(Continued)

OTHER PUBLICATIONS

Office Action issued in Japan Counterpart Patent Appl. No. 2012-272492, dated Oct. 27, 2015.

(Continued)

*Primary Examiner* — Victor MacArthur
(74) *Attorney, Agent, or Firm* — Greenblum & Bernstein P.L.C.

(57) ABSTRACT

A lock device that locks or unlocks a locking subject includes a lock member moved between a lock position where the lock member locks the locking subject and an unlock position where the lock member unlocks the unlocking subject and a movable transmission member that acts to move the lock member to at least the lock position. A guide mechanism is arranged between the transmission member and the lock member. The guide mechanism includes a sloped lock guide surface. The lock guide surface guides the lock member to the lock position when the transmission member moves in a first direction.

15 Claims, 8 Drawing Sheets

(56) References Cited

U.S. PATENT DOCUMENTS

| | | | |
|---|---|---|---|
| 5,857,365 A * | 1/1999 | Armstrong | 70/279.1 |
| 6,082,158 A * | 7/2000 | Wegner | 70/277 |
| 6,526,790 B2 * | 3/2003 | Wegner | 70/277 |
| 8,075,329 B1 * | 12/2011 | Janarthanam et al. | 439/304 |
| 8,206,172 B2 * | 6/2012 | Katagiri et al. | 439/352 |
| 8,357,001 B2 * | 1/2013 | Katagiri et al. | 439/304 |
| 8,523,589 B2 * | 9/2013 | Kurumizawa et al. | 439/304 |
| 8,523,596 B2 * | 9/2013 | Inoue et al. | 439/352 |
| 8,602,804 B2 * | 12/2013 | Kurumizawa et al. | 439/304 |
| 8,616,909 B2 * | 12/2013 | Kurumizawa et al. | 439/304 |
| 8,647,135 B2 * | 2/2014 | Kurumizawa et al. | 439/304 |
| 8,678,847 B2 * | 3/2014 | Inoue et al. | 439/352 |
| 8,708,728 B2 * | 4/2014 | Hirashita et al. | 439/304 |
| 8,845,354 B2 * | 9/2014 | Kurumizawa et al. | 439/347 |
| 2001/0035033 A1 * | 11/2001 | Wegner | 70/237 |
| 2008/0303290 A1 * | 12/2008 | Yuan | 292/195 |
| 2009/0211320 A1 * | 8/2009 | Wu | 70/277 |
| 2011/0137286 A1 * | 6/2011 | Mudd et al. | 604/506 |
| 2011/0201223 A1 * | 8/2011 | Kurumizawa et al. | 439/345 |
| 2011/0277516 A1 * | 11/2011 | Kahara et al. | 70/58 |
| 2011/0281452 A1 * | 11/2011 | Kurumizawa et al. | 439/304 |
| 2011/0287649 A1 * | 11/2011 | Kurumizawa et al. | 439/304 |
| 2011/0294328 A1 * | 12/2011 | Katagiri et al. | 439/304 |
| 2011/0300736 A1 * | 12/2011 | Katagiri et al. | 439/347 |
| 2012/0047971 A1 * | 3/2012 | Katagiri et al. | 70/58 |
| 2012/0234061 A1 * | 9/2012 | Inoue et al. | 70/255 |
| 2012/0238121 A1 * | 9/2012 | Kurumizawa et al. | 439/299 |
| 2012/0238122 A1 * | 9/2012 | Hirashita et al. | 439/304 |
| 2012/0252250 A1 * | 10/2012 | Kurumizawa et al. | 439/304 |
| 2013/0015951 A1 | 1/2013 | Kuramochi et al. | |
| 2013/0040486 A1 * | 2/2013 | Kurumizawa et al. | 439/350 |
| 2013/0047687 A1 * | 2/2013 | Kurumizawa et al. | 70/490 |
| 2013/0078840 A1 * | 3/2013 | Inoue et al. | 439/345 |
| 2013/0255333 A1 * | 10/2013 | Kurumizawa et al. | 70/237 |
| 2013/0260597 A1 * | 10/2013 | Kurumizawa et al. | 439/347 |
| 2014/0045360 A1 * | 2/2014 | Toratani et al. | 439/345 |
| 2014/0157918 A1 * | 6/2014 | Ikeda et al. | 74/89.23 |
| 2014/0169865 A1 * | 6/2014 | Kurumizawa et al. | 403/322.1 |
| 2014/0170889 A1 * | 6/2014 | Kahara et al. | 439/352 |
| 2014/0170890 A1 * | 6/2014 | Kurumizawa | 439/352 |

FOREIGN PATENT DOCUMENTS

| | | |
|---|---|---|
| JP | 2011-243500 | 12/2011 |
| JP | 2012-226911 | 11/2012 |

OTHER PUBLICATIONS

Office Action issued in Japan Counterpart Patent Appl. No. 2012-272492, dated Jan. 19, 2016, along with an english translation thereof.

* cited by examiner

LOCK DEVICE

CROSS-REFERENCE TO RELATED APPLICATIONS

This application is based upon and claims the benefit of priority from prior Japanese Patent Application No. 2012-272492, filed on Dec. 13, 2012, the entire contents of which are incorporated herein by reference.

BACKGROUND OF THE INVENTION

The present invention relates to a lock device for locking and unlocking a locking subject related to a power port.

Vehicles that emit less carbon dioxide, such as plugin hybrid vehicles and electric vehicles, are environment-friendly and have become popular. Such a vehicle is powered by a battery. When the battery drains after driving the vehicle over a long distance, the battery is recharged. The body of the vehicle is provided with a power port used to charge the battery. A charge cable of a charging facility is connected to the power port to supply power from the charging facility and charge the battery. The battery charging takes a long time. Thus, a charge cable lock device may be used to lock the charge cable to the vehicle body and prevent theft of the charge cable. Japanese Laid-Open Patent Publication No. 2009-081917 describes an example of such a charge cable lock device.

In such a lock device, it is desirable that the guiding of a lock pin to a lock position be further ensured. This ensures that the lock device locks the charge cable so that the charge cable cannot be stolen.

SUMMARY OF THE INVENTION

One aspect of the present invention provides a lock device for locking or unlocking a locking subject. The lock device includes a lock member moved between a lock position where the lock member locks the locking subject and an unlock position where the lock member unlocks the unlocking subject and a movable transmission member that acts to move the lock member to at least the lock position. A guide mechanism is arranged between the transmission member and the lock member. The guide mechanism includes a sloped lock guide surface. The lock guide surface guides the lock member to the lock position when the transmission member moves in a first direction.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE INVENTION

A lock device according to one embodiment of the present invention will now be described with reference to FIGS. 1 to 11.

Outline of Charge System

Figure 1:
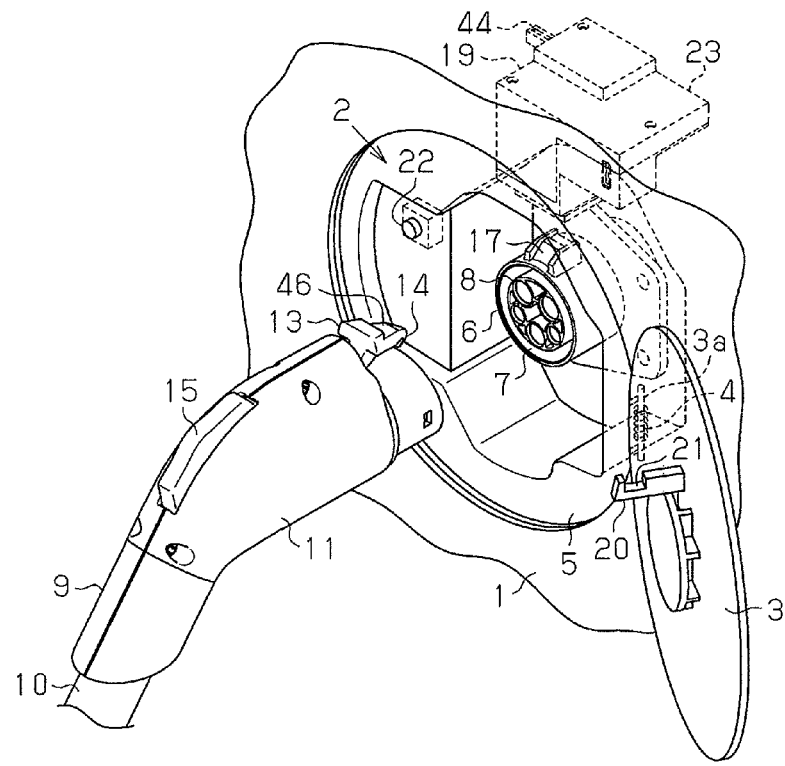
FIG. 1 is a perspective view showing a power port in one embodiment.

Referring to FIG. 1, a vehicle such as a plugin hybrid vehicle includes a charge system that allows for a battery (not shown) of the vehicle to be charged by an external power supply installed in a household, charging station, or the like. The body 1 of the vehicle has a side wall including a power port 2. A lid 3 opens and closes the power port 2. The lid 3 is pivotal about a shaft 3a, which extends in the vertical direction. An urging member 4, such as a torsion spring, is arranged on the shaft 3a to urge the lid to an open position. An inlet 6, which serves as a power receiving connector, is arranged at the middle of a lid box 5 in the power port 2. The inlet 6 includes a cylindrical inlet case 7, a terminal portion 8 arranged in the inlet case 7, and a catch 17 arranged on the inlet case 7. The lid 3 corresponds to a locking subject.

Figure 2:
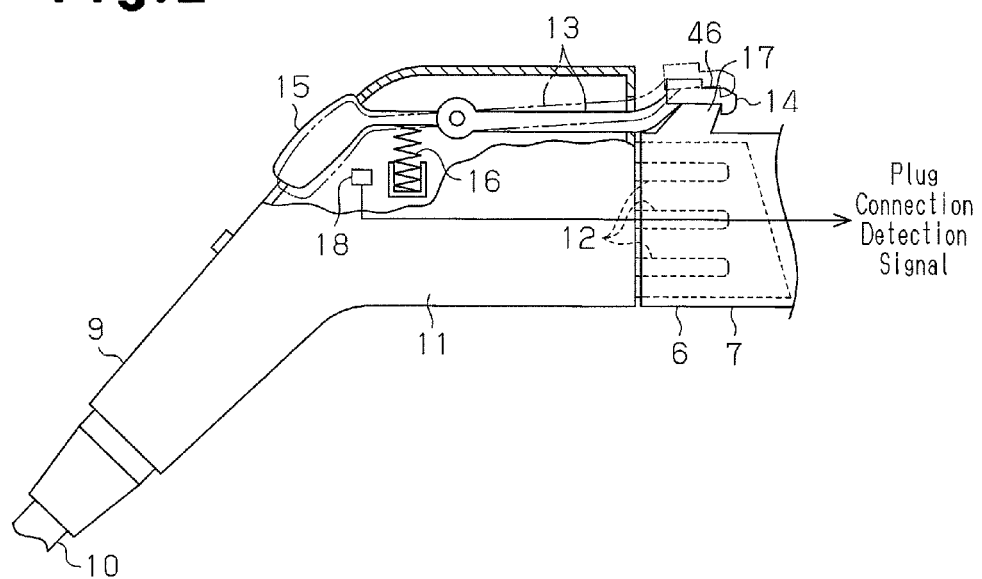
FIG. 2 is a diagram showing the connection of a charge cable to an inlet.

Referring to FIG. 2, a charge cable 9 extending from an external power supply is connectable to the inlet 6. The charge cable 9 includes a cable portion 10 and a power plug 11, which is arranged on the distal end of the cable portion 10. A terminal portion 12 is arranged on the distal end of the power plug 11 in correspondence with the terminal portion 8 of the inlet 6. A lock arm 13 is pivotally coupled to the power plug 11 to hold the power plug 11 on the inlet 6. The lock arm 13 includes a hook 14, which is arranged on the distal end of the lock arm 13, and an arm operation portion 15, which is arranged on the basal end of the lock arm 13. The hook 14 and the arm operation portion 15 are exposed to the exterior. An urging member 16 is arranged on the lock arm 13 near the arm operation portion 15 to constantly urge the lock arm 13 to a close position. The charge cable 9 corresponds to a locking subject.

When the power plug 11 is connected to the inlet 6, the power plug 11 is fitted straight to the inlet 6. The hook 14 comes into contact with a sloped surface of the catch 17 on the inlet case 7. This lifts the hook 14 against the urging force of the urging member 16. After the hook 14 moves over the sloped surface, the power plug 11 is fully fitted to the inlet 6. Then, the urging force of the urging member 16 pivots the lock arm 13 to the close position. This hooks the hook 14 to the catch 17 so that the power plug 11 is held by the inlet 6.

A plug connection detector 18 is arranged in the power plug 11 to detect connection of the charge cable 9 to the inlet 6. When the charge cable 9 is connected to the inlet 6 and the hook 14 is hooked to the catch 17, the lock arm 13 is arranged at the close position. Thus, the plug connection detector 18 detects that the lock arm 13 is located at the close position and provides a plug connection detection signal, which indicates that the power plug 11 is connected to the inlet 6, to the vehicle body 1 via the terminal portions 8 and 12.

Structure of Lock Device

As shown in FIG. 1, the power port 2 includes a lock device 19 capable of locking both of the lid 3 and the charge cable 9. In other words, the lock device 19 of the present example is of an integrated type in which the locking of the lid 3 and the locking of the charge cable 9 are performed with the same actuator. A striker 20 projects from a rear surface of the lid 3. The lock device 19 engages the striker 20 when locking the lid 3. An engagement groove 21 having a predetermined depth is formed in the distal end of the striker 20. A trigger switch 22 is arranged in the power port 2. The trigger switch 22 may be of a push type. The trigger switch 22 is capable of detecting, for example, the opening and closing of the lid 3 or further inward pushing of the lid 3 from a closed position.

Figure 3:
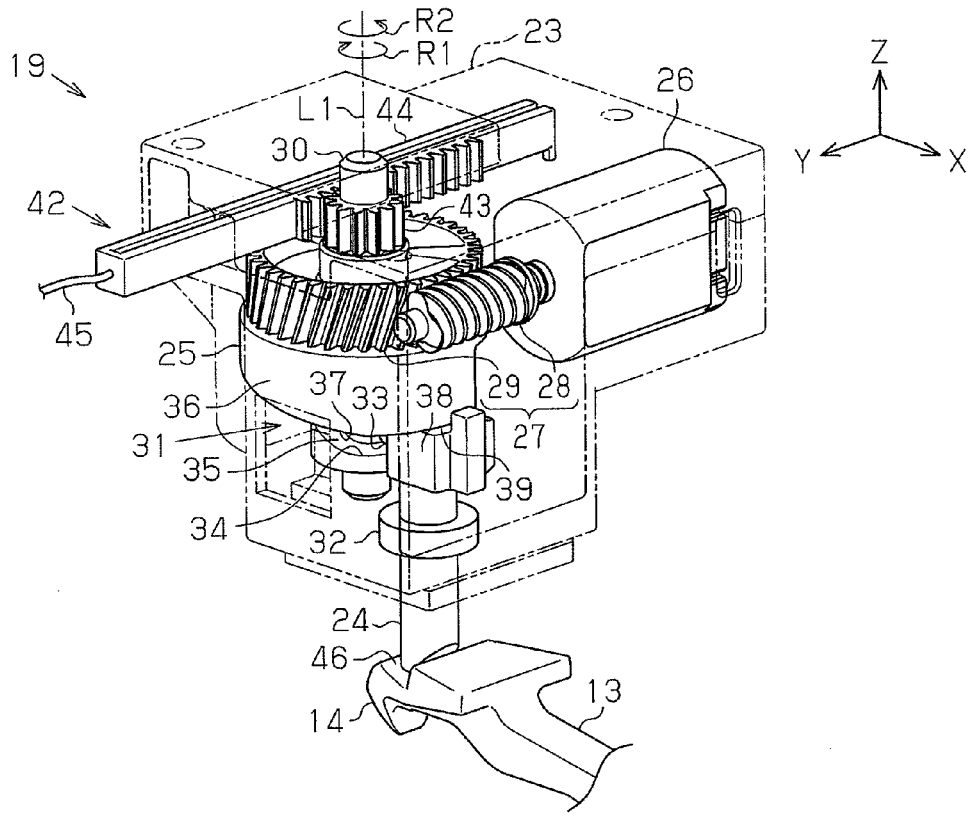
FIG. 3 is a perspective view showing the structure of a lock device.

As shown in FIG. 3, the lock device 19 includes a housing 23 that accommodates a lock pin 24, which is engageable with the lid 3 and the power plug 11. The lock pin 24 is movable back and forth in its longitudinal direction (Z axis direction in FIG. 3). A pivot piece 25 couples the lock pin 24 to a lock motor 26. The pivot piece 25 may be pivoted without substantially changing its center position. A worm gear 27 couples the pivot piece 25 to a motor shaft of the lock motor 26. The worm gear 27 includes a worm 28, which is arranged on the motor shaft, and a worm wheel 29, which is arranged on the central portion of the pivot piece 25. The drive force of the lock motor 26 pivots the pivot piece 25 about the axis L1 of a cylindrical shaft 30. This moves lock pin 24 back and forth with a guide mechanism 31. The lock pin 24 and the shaft 30 intersect the motor shaft of the lock motor 26. The lock motor 26 may be, for example, a DC motor. The lock pin 24 corresponds to a lock member, and the lock motor 26 corresponds to an actuator.

Figure 4:
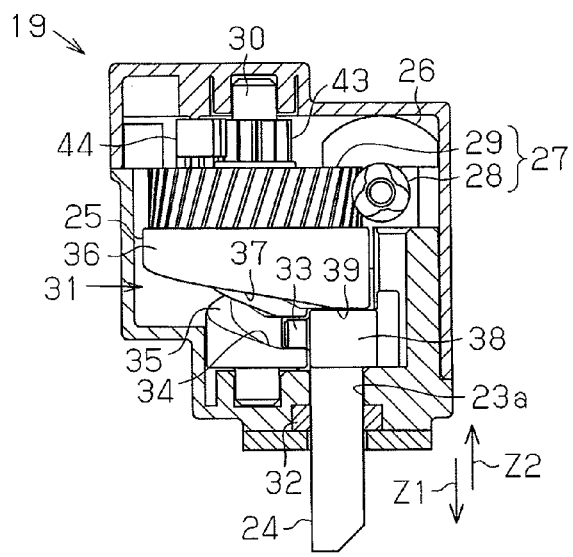
FIG. 4 is a cross-sectional view of the lock device.

As shown in FIG. 4, the lock pin 24 is movably fitted into an accommodation hole 23a formed in a bottom wall of the housing 23. When the lock pin 24 moves in a lock direction (direction of arrow Z1 in FIG. 4), a large portion of the lock pin 24 is projected out of the opening of the accommodation hole 23a. When the lock pin 24 moves in an unlock direction (direction of arrow Z2 in FIG. 4), the lock pin 24 is drawn into the accommodation hole 23a. A seal 32 is fixed around the lock pin 24 to provide a waterproof structure between the lock pin 24 and the wall of the accommodation hole 23a. The seal 32 may be, for example, an O-ring received in an annular groove formed in the inner wall of the housing 23.

Figure 5A:
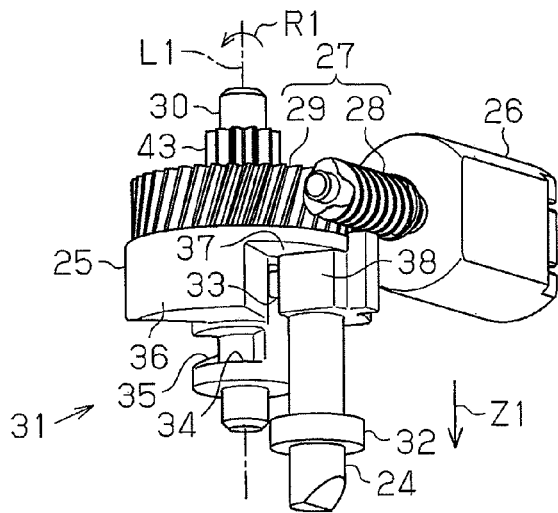
FIGS. 5A to 5c are perspective views showing the movement of the lock device.
Figure 5B:
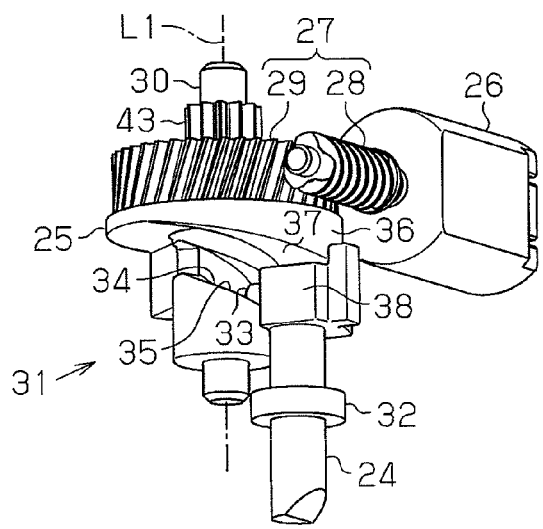
Figure 5C:
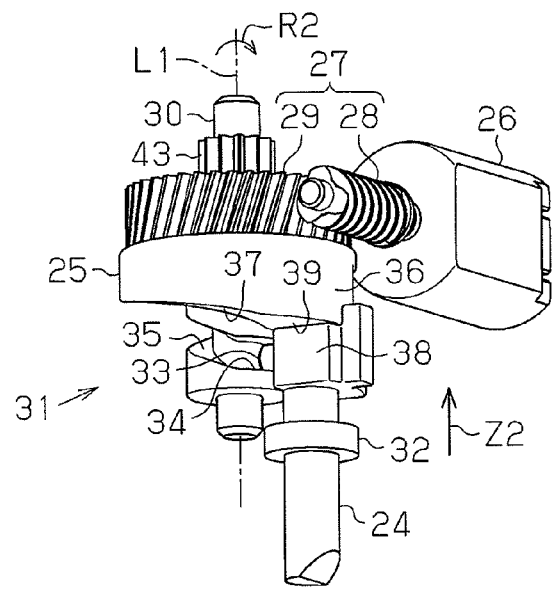

FIGS. 5A to 5C show a guide mechanism 31 in detail. A pin-shaped hooking projection 33 projects sideward from an upper portion of the lock pin 24. The hooking projection 33 is hooked to a diagonal guide groove 34 (slope) formed in the shaft 30 of the pivot piece 25. A predetermined clearance is provided between the lock pin 24 and the guide groove 34. In this manner, the lock device 19 of the present example is of a direct-connection type that mechanically connects the lock pin 24 and the pivot piece 25. When the pivot piece 25 rotates in a second direction (direction of arrow R2 in FIG. 5C), the lower sloped surface (hereafter referred to as the unlock guide surface 35), or the lower groove edge, lifts the hooking projection 33 and guides the lock pin 24 in the unlock direction (direction of arrow Z2 in FIG. 5C).

A lock guide projection 36 is arranged at a lower side of the worm wheel 29 to guide the lock pin 24 to a lock position. When the pivot piece 25 rotates in a first direction (direction of arrow R1 in FIG. 5A), the lower sloped surface (hereinafter referred to as the lock guide surface) of the lock guide projection 36 lowers a head 38 of the lock pin 24 and guides the lock pin 24 in the lock direction (direction of arrow Z1 in FIG. 5A).

As shown in FIG. 5C, the lock guide projection 36 has a lowermost portion defining a holding surface 39 that holds the lock pin 24 at the lock position. The wide holding surface 39 supports the head 38 of the lock pin 24 to hold the lock pin 24 at the lock position even when force is applied in the unlock direction to lift the lock pin 24 from the lock position.

Figure 6A:
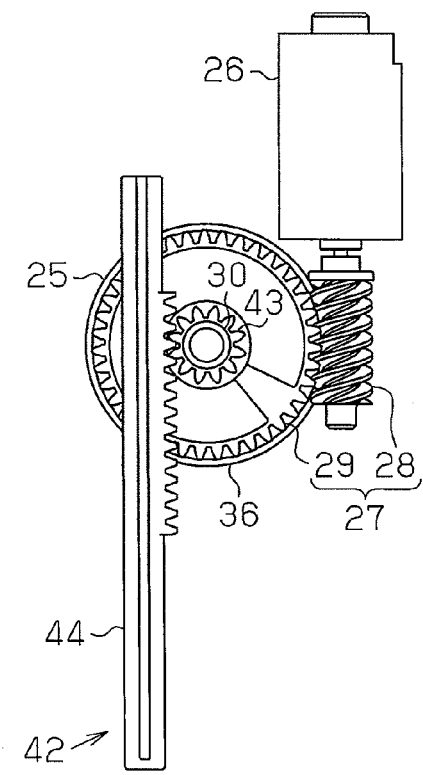
FIG. 6A is a plan view and a side view showing the lock device in an unlock state.
Figure 6A:
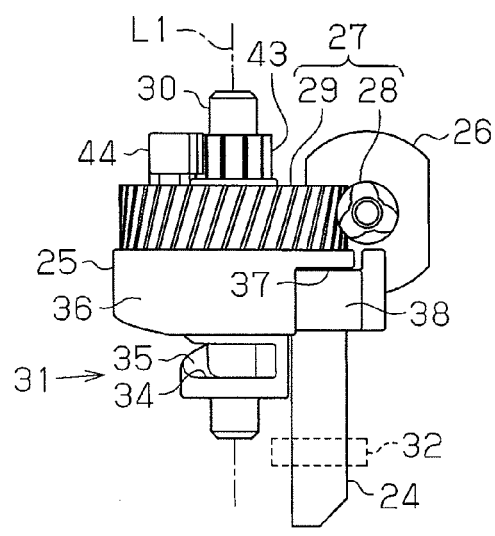
Figure 6B:
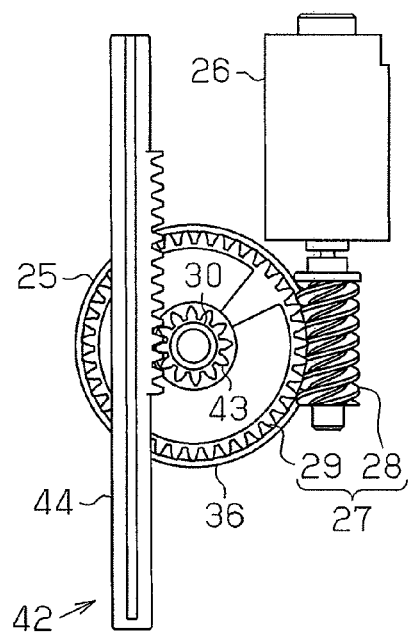
FIG. 6B is a plan view and a side view showing the lock device in a lock state.
Figure 6B:
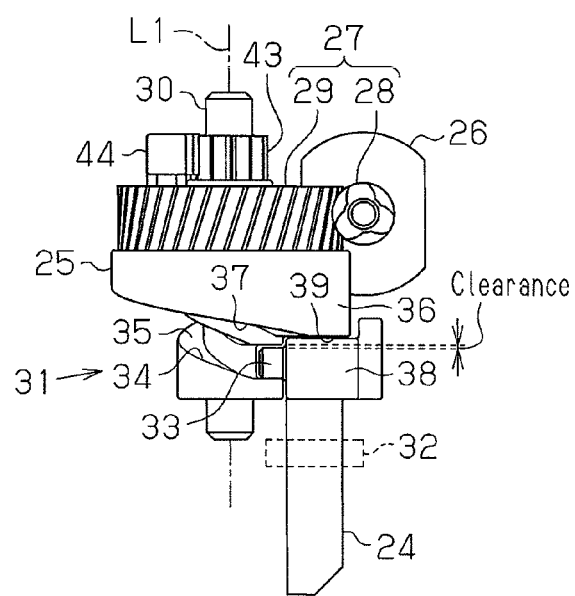

Referring to FIG. 6A, when the lid 3 is closed and the lock pin 24 is moved to the unlock position, the lid 3 is unlocked. When the charge cable 9 is connected to the inlet 6 and the lock pin 24 is moved to the unlock position, the charge cable 9 is unlocked. Referring to FIG. 6B, when the lid 3 is closed and the lock pin 24 is moved to the lock position, the lid 3 is locked. When the charge cable 9 is connected to the inlet 6 and the lock pin 24 is moved to the lock position, the charge cable 9 is locked.

Shape of Unlock Guide Surface and Lock Guide Surface

Figure 7:
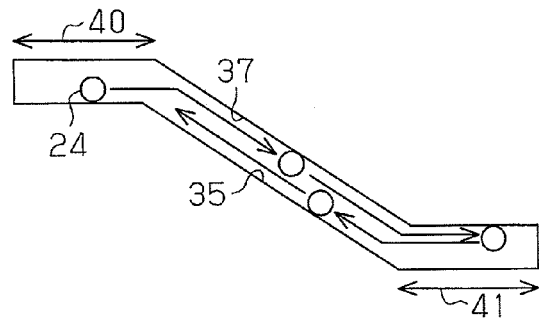
FIG. 7 is a schematic diagram showing an unlock guide surface and a lock guide surface spread out on a plane.

FIG. 7 is a schematic diagram showing the unlock guide surface 35 and a lock guide surface 37 spread out on a plane. In FIG. 7, the circle represents the lock pin 24. The lock pin 24 moves along a path extending between an unlock side terminal end, which defines an unlock side accessing region 40, and a lock side terminal end, which defines a lock side accessing region 41. The unlock side accessing region 40 and the lock side accessing region 41 are planar pin paths and in which the lock pin 24 starts to move. If the lock pin 24 were to be moved on a sloped surface from the beginning, a large torque may be necessary to start moving the lock pin 24. By first moving the lock pin 24 along a planar portion, the torque used to start moving the lock pin 24 may be decreased.

Forcible Unlocking Mechanism

Referring to FIG. 3, the lock device 19 includes a forcible unlocking mechanism 42 that allows for the lock device 19 to be forcibly switched to an unlock state when manually operated. When the lock device 19 is in a lock state and, for example, the lock motor 26 cannot be operated due to a failure in the lock motor 26 or a failure in a peripheral circuit, the lock device 19 that uses the lock motor 26 as a drive source cannot be switched to an unlock state.

Therefore, the upper end of the shaft 30 of the pivot piece 25 includes a pinion 43, which is coaxial with the pivot piece 25 and rotated integrally with the pivot piece 25. A pull cord 45, such as a wire, is attached to an end of a rack 44. The pull cord 45 has a distal end arranged in the vehicle (e.g., in luggage compartment). When the pull cord 45 is pulled, the rack 44 is also pulled and moved. This rotates the pivot piece 25 in the second direction (direction of arrow R2 in FIG. 3) and forcibly moves the lock pin 24 to the unlock position.

The operation of the lock device 19 will now be described with reference to FIGS. 8 to 11.

Lid Unlock Operation

Figure 8:
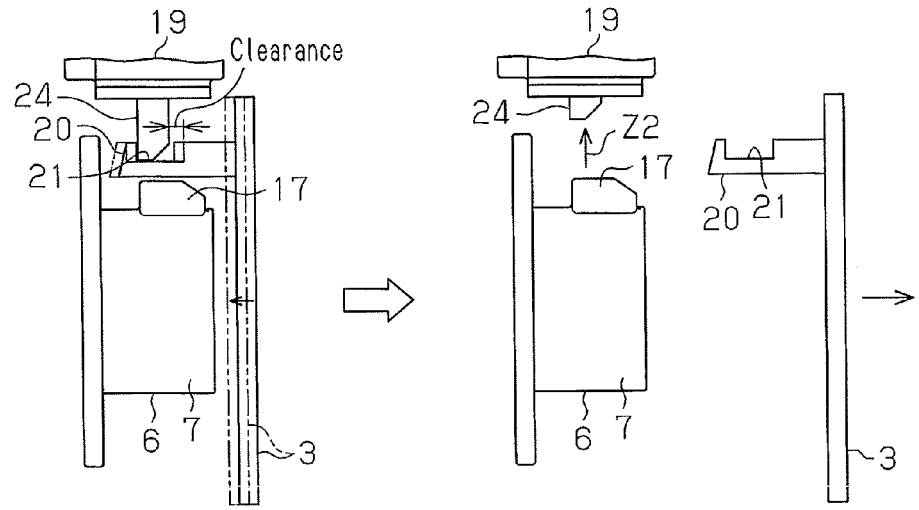
FIG. 8 is a schematic diagram showing the lock device when a lid is unlocked.

Referring to FIG. 8, when the lid 3 is closed and the lock pin 24 is located at the lock position, the lock pin 24 is engaged with the engagement groove 21 of the striker 20. This locks the lid 3. Thus, the lid 3 cannot be opened by an unauthorized person. When the lid 3 is closed, a clearance between the lock pin 24 and the engagement groove 21 allows for the lid 3 to be pushed inward against the urging force of the urging member 4.

When the lid 3 is locked and conditions for unlocking the lid 3 are satisfied, current flows in an unlock direction to the lock motor 26 for a predetermined time, and the lock motor 26 generates rotation in an unlock direction. When the lock motor 26 generates rotation in the unlock direction, the lock pin 24 moves through the lock side accessing region 41. After the pivot piece 25 starts rotating in the unlock direction, the unlock guide surface 35 lifts the hooking projection 33 as the lock pin 24 moves in the unlock direction (direction of arrow Z2 in FIG. 8). The lock pin 24 is separated from the engagement groove 21 when moved to the unlock position. This unlocks the lid 3 and permits opening of the lid 3. The urging force of the urging member 4 opens the lid 3 for a predetermined amount. Subsequently, the lid 3 may be manually opened.

The lid unlocking conditions include, for example, the operation of a predetermined button (switch) arranged in the vehicle, an unlocking operation of the vehicle door (door unlocking cooperation), and further inward pushing of the closed lid 3 when ID verification is accomplished by an electronic key system. The electronic key system may be an operation-free key system that starts ID verification through bidirectional narrow-band wireless communication (communication distance of several meters) in response to communication from a vehicle.

Lid Lock Operation

Figure 9:
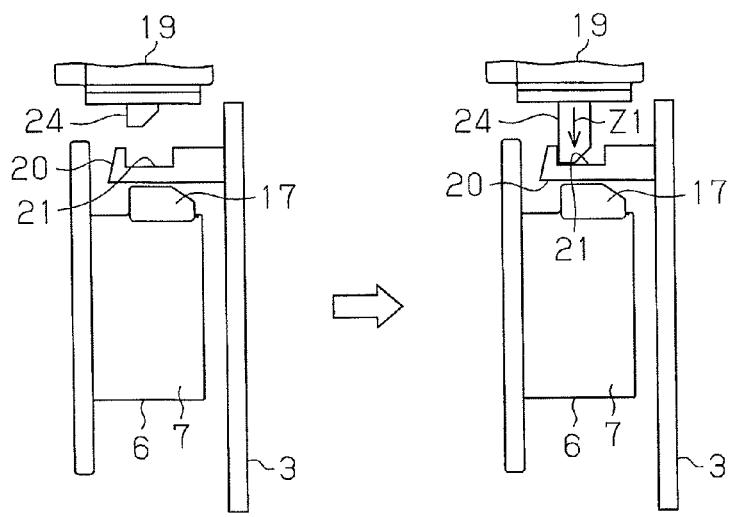
FIG. 9 is a schematic diagram showing the lock device when a lid is locked.

Referring to FIG. 9, when the lid 3 is unlocked and the lid 3 is closed, the engagement groove 21 of the striker 20 is located immediately below the lock pin 24. Under this situation, when lid locking conditions are satisfied, current flows in a lock direction to the lock motor 26 for a predetermined time, and the lock motor 26 generates rotation in a lock direction. When the lock motor 26 generates rotation in the lock direction, the lock pin 24 moves through the unlock side accessing region 40. After the pivot piece 25 starts rotating in the lock direction, the unlock guide surface 35 lowers the head 38 of the lock pin 24 as the lock pin 24 moves in the lock direction (direction of arrow Z1 in FIG. 9). The distal end of lock pin 24 is engaged with the engagement groove 21 when moved to the lock position. This locks the lid 3 so that an unauthorized person cannot open the lid 3.

The lid locking conditions include, for example, only the locking of the vehicle door (door locking cooperation) and door locking cooperation under the assumption that the lid 3 is closed. Further, the lid locking conditions may include the accomplishment of ID verification performed by the electronic key system.

Charge Cable Lock Operation

Figure 10:
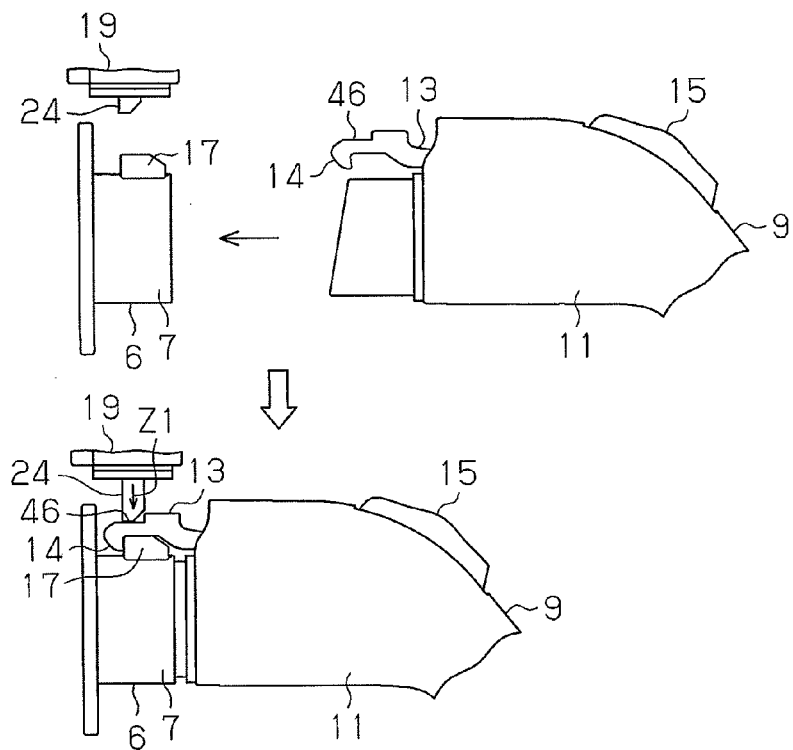
FIG. 10 is a schematic diagram showing the lock device when the charge cable is locked.

Referring to FIG. 10, when the lid 3 is open, the lock pin 24 is located at the unlock position. Thus, before the charge cable 9 is connected to the inlet 6, a charge cable lock is open. This allows for connection of the charge cable 9 to the inlet 6. When the power plug 11 is forced to an innermost position in the inlet 6, the hook 14 of the lock arm 13 is hooked to the catch 17 of the inlet 6.

When the user connects the charge cable 9 to the inlet 6 and charge cable lock conditions are then satisfied, current flows in a lock direction to the lock motor 26 for a predetermined time, and the lock motor 26 generates rotation in a lock direction. In the same manner as when locking the lid 3, the lock pin 24 moves in the lock direction (direction of arrow Z1 in FIG. 10) as the lock motor 26 generates rotation in the lock direction. When the lock pin 24 is moved to the lock position, the distal end of lock pin 24 comes into contact with the upper surface of the hook 14 that defines an abutment surface 46. This locks the charge cable 9. Since the hook 14 of the lock arm 13 is pushed by the lock pin 24 from above, the lock arm 13 cannot be pivoted to the open position. Thus, the power plug 11 connected to the inlet 6 cannot be removed from the inlet 6 by an unauthorized person or the like.

The charge cable locking conditions include, for example, a locking operation performed on an operation switch dedicated for charge cable locking. The operation switch may be arranged in the power port 2 or in the vehicle. Another charge cable locking condition may be, for example, a plug connection detection signal, which is output from the plug connection detector 18 of the power plug 11, being received by the vehicle body 1 when the vehicle door is locked (door locking cooperation).

Charge Cable Unlock Operation

Figure 11:
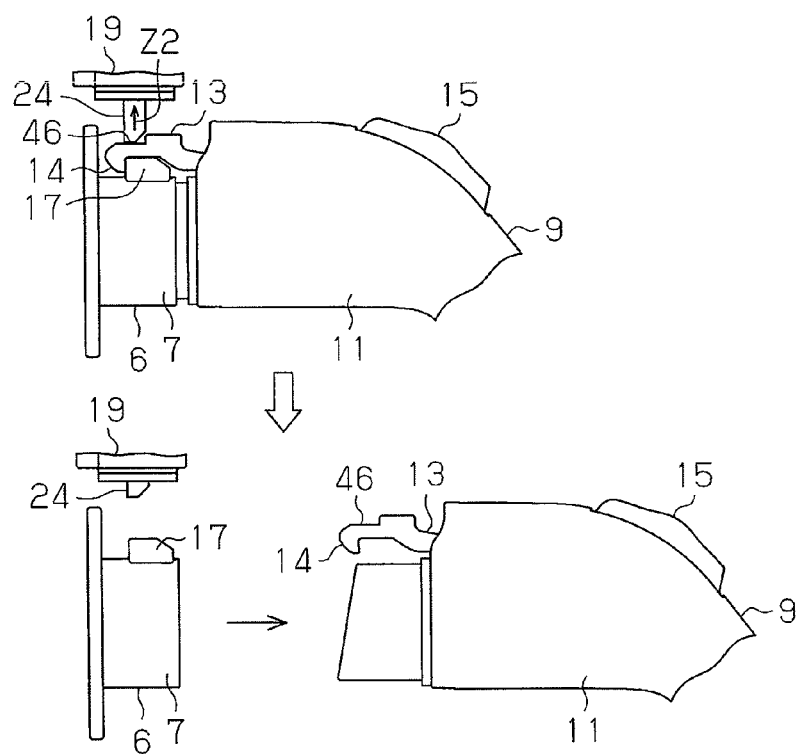
FIG. 11 is a schematic diagram showing the lock device when the charge cable is unlocked.

Referring to FIG. 11, when the charge cable 9 is locked and charge cable unlocking conditions are satisfied, current flows in an unlock direction to the lock motor 26 for a predetermined time, and the lock motor 26 generates rotation in an unlock direction. In the same manner as when unlocking the lid 3, the lock pin 24 moves in the unlock direction (direction of arrow Z2 in FIG. 11) as the lock motor 26 generates rotation in the unlock direction. When the lock pin 24 is moved to the unlock position, the distal end of lock pin 24 is separated from the abutment surface 46 of the hook 14. This unlocks the charge cable 9. Thus, the lock arm 13 may be pivoted to the open position, and the charge cable 9 may be removed from the inlet 6.

The charge cable unlocking conditions include, for example, an unlocking operation performed on an operation switch dedicated for charge cable locking. Another charge cable unlocking condition may be, for example, a plug connection detection signal, which is output from the plug connection detector 18 of the power plug 11, being received by the vehicle body 1 when the vehicle door is unlocked (door unlocking cooperation).

The present embodiment has the advantages described below.

(1) During a locking operation, the lock guide surface 37 of the lock guide projection 36, which is arranged in the pivot piece 25 and has a large diameter, lowers and pushes the lock pin 24 in the lock direction. During an unlocking operation, the unlock guide surface 35 of the guide groove 34 lifts and draws the lock pin 24 in the unlock direction. Thus, during a locking operation, the lock guide surface 37 guides the lock pin 24 to the lock position. This ensures that locking and unlocking is properly performed. Further, the locking and unlocking operations are performed by pushing the lock pin 24 on different dedicated slopes. Thus, the lock pin 24 may be moved to the lock position or the unlock position without using the same portion during the locking operation and the unlocking operation. Since load is applied to different portions of the lock pin 24 and the pivot piece 25 during locking and unlocking operations, the durability is improved.

(2) The hooking projection 33, which projects from the lock pin 24, is hooked to the guide groove 34 of the pivot piece 25 to couple the lock pin 24 to the pivot piece 25. Thus, the structure that hooks a pin to a groove rigidly couples the lock pin 24 and the pivot piece 25.

(3) The pivot piece 25 is used as a transmission member that may be pivoted without changing its center position. Thus, space allowing for movement of the transmission member is not necessary for the lock device 19. This contributes to miniaturization of the lock device 19.

(4) The lowermost portion of the lock guide surface 37 defines the planar holding surface 39 that supports the head 38 of the lock pin 24 at the lock position. Thus, during the locking operation, even when external force is applied to the lock pin 24 in the unlock direction, the force may be received by the holding surface 39. This makes it difficult to move the lock pin 24 in the unlock direction in an unauthorized manner and improves the effect for preventing unauthorized unlocking.

(5) When the lock pin 24 is moved in the unlock direction or the lock direction, the lock pin 24 moves through the unlock side accessing region 40 or the lock side accessing region 41 before reaching the guide surface. Since the lock pin 24 starts moving in the unlock side accessing region 40 or the lock side accessing region 41 when moved to the lock position or the unlock position, the movement of the lock pin 24 is further ensured.

(6) The lock device 19 is driven by the lock motor 26. Thus, locking and unlocking are automatically performed. This improves convenience.

(7) The pull cord 45 is attached to the rack 44, and the forcible unlocking mechanism 42 forcibly switches the lock device 19 to an unlock state when manually operated. Thus, for example, when a failure occurs in the lock motor 26 or its peripheral circuit, the lock device 19 may be switched to an unlock state by pulling the pull cord 45 to rotate the pivot piece 25 in the unlock direction. Thus, even when a failure occurs in the lock motor 26 or its peripheral circuit, the lock device 19 may be manually returned to an unlock state.

(8) A clearance is constantly formed between the hooking projection 33 of the lock pin 24 and the upper surface of guide groove 34 (refer to side view of FIG. 6B). Thus, even when an external force is applied to the lock pin 24 in the unlock direction in a lock state, the hooking projection 33 does not strike the upper surface of the guide groove 34. This obviates damage of the engagement projection and further improves the effect for preventing unauthorized unlocking.

(9) Charge cable locking and lid locking both use the same lock pin 24, which is selectively moved to the lock position and the unlock position by the lock motor 26. Since there is no need for a set of the lock pin 24 and the lock motor 26 to be provided for each of the charge cable locking and the lid locking, the structure of the lock device 19 may be simplified.

It should be apparent to those skilled in the art that the present invention may be embodied in many other specific forms without departing from the spirit or scope of the invention. Particularly, it should be understood that the present invention may be embodied in the following forms.

Figure 12:
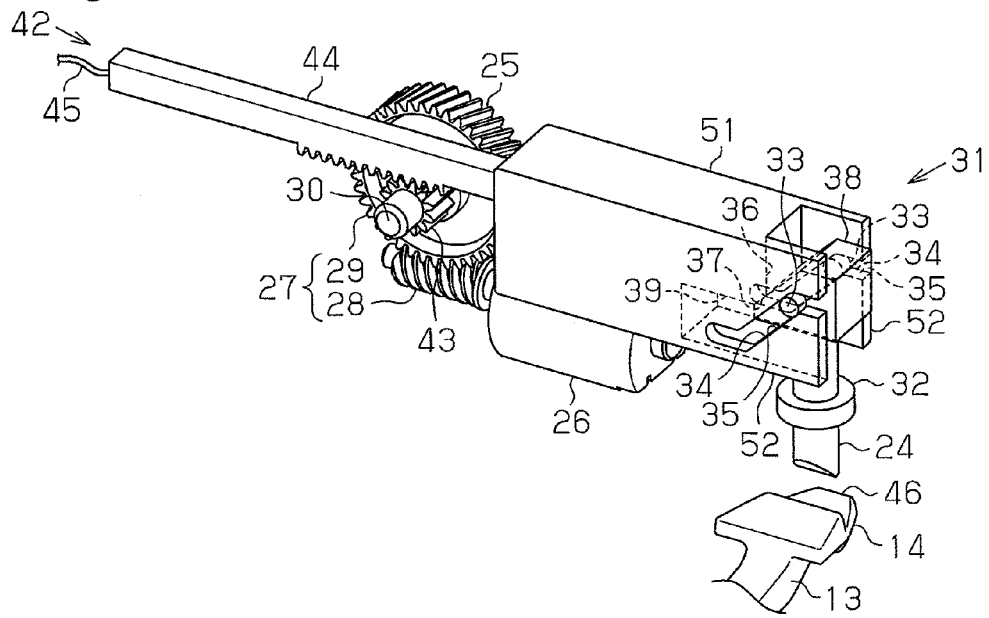
FIG. 12 is a schematic perspective view showing a further example of a lock device.
Figure 13A:
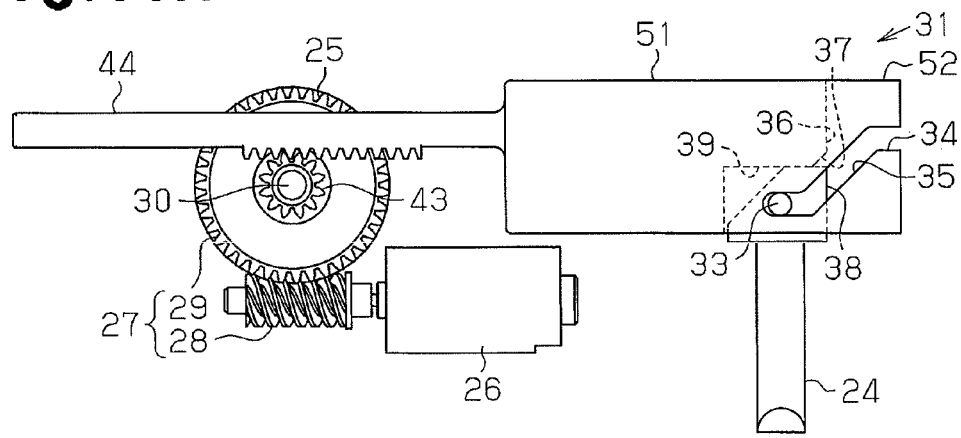
FIG. 13A is a side view showing a further example of a lock device in a lock state.
Figure 13B:
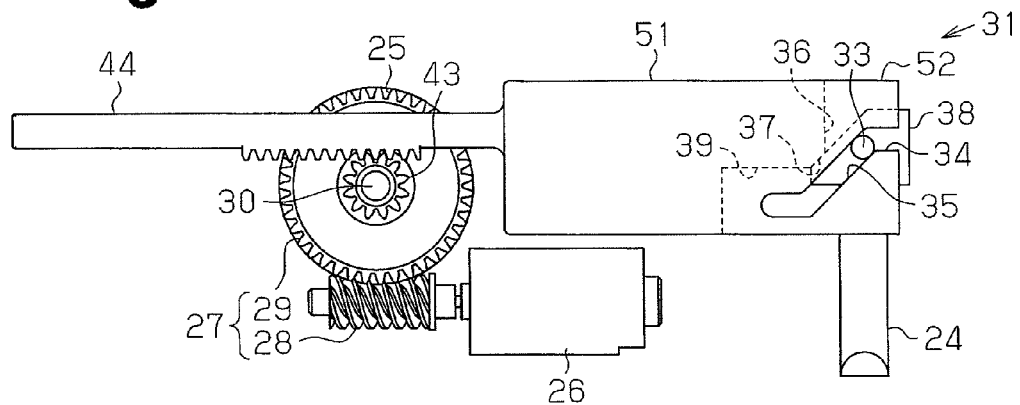
FIG. 13B is a side view showing the lock device of FIG. 13B in an unlock state.

As shown in FIGS. 12, 13A, and 13B, the lock pin 24 may be coupled to the rack 44. In this case, a lock pin coupling portions 51 is formed in an end of the rack 44, and a guide groove 34 is formed in each of two side walls 52 at an end of the lock pin coupling portion. The lock pin 24 includes two hooking projections 33, each engaging one of the grooves 34. The lower surface of each guide groove 34 defines an unlock guide surface 35, and a lock guide surface 37 extends between the two side wall 52. This structure also increases the durability of the lock device 19.

Figure 14A:
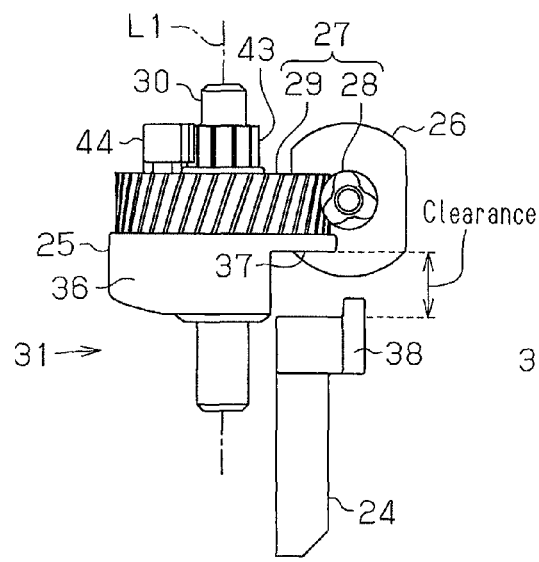
FIG. 14A is a side view showing another example of a lock device in an unlock state.
Figure 14B:
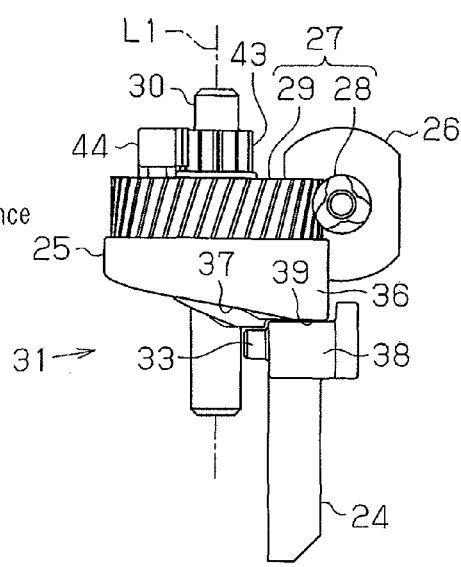
FIG. 14B is a side view showing the lock device of FIG. 14A in a lock state.
Figure 15A:
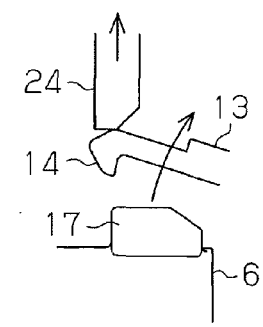
FIG. 15A is a schematic diagram showing the removal of the charge cable from the inlet.
Figure 15B:
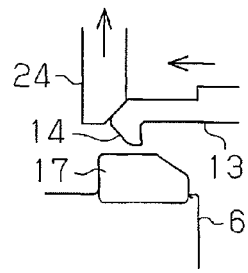
FIG. 15B is a schematic diagram showing the connection of the charge cable to the inlet.

As shown in FIGS. 14A and 14B, the unlock guide surface 35 may be omitted from the guide mechanism 31. In this case, the lock device 19 is not of a direct-connection type, and the lock pin 24 and the pivot piece 25 move independently. In this structure, as shown in FIG. 14A, in an unlock state, the clearance formed above the lock pin 24 allows for upward movement of the lock pin 24. Thus, as shown in FIG. 15A, the charge cable 9 is removed from the inlet 6 by moving the lock arm 13 to the open position and lifting the lock pin 24. Further, as shown in FIG. 15B, the charge cable 9 is connected to the inlet 6 by lifting the lock pin 24 with the distal end of the lock arm 13. Further, even if the lock pin 24 is stopped when moved in the upward direction during a locking operation, the lock pin 24 may be pushed downward with the lock guide surface 37 to move the lock pin 24 to the lock position.

The electronic key system may be, for example, a wireless key system or a short-range wireless communication system. A wireless key system performs key verification through narrow-band wireless communication when communication is established with an electronic key. A short-range wireless communication system performs verification through bidirectional short-range wireless communication (communication distance of several centimeters to several tens of centimeters) and may be, for example, an immobilizer system or a near field communication (NFC) system.

The actuator of the lock device 19 may be, for example, a solenoid instead of a motor.

The plug connection detector 18 may be a switch or a sensor arranged in the inlet 6. Further, the plug connection detector 18 may include or not include a contact.

The seal 32 may be fixed to the lock pin 24.

The hooking projection 33 may be arranged on the pivot piece 25. The guide groove 34 may be arranged in the lock pin 24.

The unlock guide surface 35 and the lock guide surface 37 may be straight or curved.

The lock pin 24 and the pivot piece 25 do not have to be coupled to each other by hooking a pin to a groove. As long as the lock pin 24 may be moved in the vertical direction by the pivot piece 25, various structures may be used to couple the lock pin 24 and the pivot piece 25.

The lid 3 may be opened and closed by a push lifter instead of a torsion spring.

During lid locking, the lock pin 24 may be engaged with a component other than the striker 20.

The lock device 19 may be fastened together with the inlet 6 when coupled to the lid box 5 or coupled separately to the lid box 5.

The lock device 19 may be manually switched to a lock state or an unlock state by a user.

One of locking and unlocking with the lock device 19 may be performed manually, and the other one of locking and unlocking may be performed automatically.

The lock device 19 may be dedicated for charge cable locking or for lid locking. Further, charge cable locking and lid locking may be performed using different lock pins 24. Further, in broad terms, the lock device 19 only needs to be arranged in the power port 2.

The locking subject does not have to be the lid 3 or the charge cable 9 and may be any component related with the power port.

In the lock device 19, for example, an urging member may constantly urge the lock pin 24 in the lock direction.

The lock device 19 may have any structure as long as the lock pin 24 may be moved in the lock direction and the unlock direction. Thus, the transmission member is not limited to the pivot piece 25 and may be, for example, a sliding member. Further, the lock member does not have to be a movable pin and may be, for example, a pivotal cylindrical pin member including a cutout portion. In this case, the lock arm 13 is fixed by a location free from the cutout portion, and the cutout portion allows for operation of the lock arm 13.

The lock device 19 may be in a lock state, for example, when the lock pin 24 is directly hooked to a housing (main body portion) of the power plug 11

The lock device 19 does not have to be coupled to the upper portion of the lid box 5 and may be coupled to other locations, such as a side portion of the lid box 5.

The lock device 19 does not have to be installed in a vehicle and may be applied to a different device or instrument.

The present examples and embodiments are to be considered as illustrative and not restrictive, and the invention is not to be limited to the details given herein, but may be modified within the scope and equivalence of the appended claims.

The invention claimed is:

1. A lock device for locking or unlocking a locking subject, the lock device comprising:
    a lock member movable, in an axial direction of the lock member, between a lock position where the lock member locks the locking subject and an unlock position where the lock member unlocks the locking subject, the lock member includes an axial end face that axially pushes the locking subject, which includes one of a power plug and a lid for a power plug, to immobilize the locking subject when the lock member moves to the lock position;
    a movable transmission member that rotates to move the lock member to at least the lock position; and
    a guide mechanism, between the transmission member and the lock member, the guide mechanism including a sloped lock guide surface,
    wherein the lock guide surface guides the lock member to the lock position when the transmission member moves in a first direction, and
    wherein the transmission member is a pivotal element that is rotatable about an axis, and
    the lock guide surface is provided on the pivotal element.

2. The lock device according to claim 1, wherein
    the transmission member is coupled to the lock member,
    the transmission member moves the lock member between the lock position and the unlock position,
    the guide mechanism further includes a sloped unlock guide surface between the transmission member and the lock member, and
    the unlock guide surface guides the lock member to the unlock position when the transmission member moves in a second direction, which is opposite to the first direction.

3. The lock device according to claim 2, further comprising:
    a hooking projection that projects from one of the lock member and the transmission member; and
    a groove in the other one of the lock member and the transmission member, wherein
    the lock member is coupled to the transmission member by hooking the hooking projection to the groove,
    the lock member is moved in a lock direction when pushed by the lock guide surface, and
    the lock member is moved in an unlock direction when pushed by the unlock guide surface that is a portion of the groove.

4. The lock device according to claim 2, wherein
    the guide mechanism includes a planar accessing region connected to an end of one of the lock guide surface and the unlock guide surface, and
    the lock member moves through the accessing region before reaching the connected guide surface.

5. The lock device according to claim 2, the guide mechanism further including at least one surface that extends substantially perpendicular to the direction of movement of the lock member.

6. The lock device according to claim 1, wherein the lock guide surface includes a holding surface that holds the lock member at the lock position.

7. The lock device according to claim 1, further comprising an actuator that moves the transmission member to perform at least one of locking and unlocking of the locking subject.

8. The lock device according to claim 1, wherein the lock member comprises an elongated bar including the end face configured to axially push the locking subject to immobilize the locking subject when the lock member moves to the lock position.

9. The lock device according to claim 1, wherein the lock member is translated between the lock position and the unlock position in response to rotation of the transmission member about an axis parallel to the translation direction of the lock member.

10. The lock device according to claim 1, wherein the transmission member and the guide mechanism rotate about a common axis.

11. The lock device according to claim 1, the guide mechanism including a coupling that is configured to translate in a direction substantially transverse to the direction of movement of the lock member.

12. The lock device according to claim 1, the end face of the lock member distal from the transmission member is configured to axially push the locking subject to immobilize the locking subject when the lock member moves to the lock position.

13. The lock device according to claim 1, the lock member comprises an elongated bar including an end face distal from the transmission member, the end face configured to axially push the locking subject to immobilize the locking subject when the lock member moves to the lock position.

14. The lock device according to claim 1, the lock member comprising an elongated, axially translatable member, a portion of the lock member spaced from the axial end face being engaged with the guide mechanism.

15. The lock device according to claim 1, the lock member comprises an elongated bar that translates axially between the lock position and the unlock position, a projection of the lock member that extends in a direction transverse to the axial direction of the lock member couples the lock member to the transmission member.

* * * * *